United States Patent
Muthigi et al.

(10) Patent No.: US 9,033,011 B1
(45) Date of Patent: May 19, 2015

(54) TIRE COMPRISING A TREAD WITH ASYMMETRIC GROOVE PROFILES

(71) Applicant: The Goodyear Tire & Rubber Company, Akron, OH (US)

(72) Inventors: Phaniraj Muthigi, Copley, OH (US); Jean-Louis Marie Felicien Thomas, Waltzing (BE); Francois Philippe Depouhon, Arlon (BE); Julien Alexandre Fursthos, Basse Ham (FR); Michael Howard Curtis, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/100,199

(22) Filed: Dec. 9, 2013

(51) Int. Cl.
*B60C 11/03* (2006.01)
*B60C 11/04* (2006.01)
*B60C 11/13* (2006.01)

(52) U.S. Cl.
CPC .......... *B60C 11/1323* (2013.04); *B60C 11/042* (2013.04); *B60C 2011/0341* (2013.04)

(58) Field of Classification Search
CPC ............... B60C 2200/04; B60C 2201/0341; B60C 2011/0344; B60C 2011/0353; B60C 2011/0355; B60C 2011/0386; B60C 2011/0388; B60C 2011/039; B60C 11/04; B60C 11/042; B60C 11/13; B60C 11/1307; B60C 11/1315; B60C 11/1323; B60C 11/1353; B60C 11/1392

USPC ................. 152/209.1, 209.3, 209.18, 209.23, 152/209.24, 900, 901, 209.8, 209.9
See application file for complete search history.

(56) References Cited

U.S. PATENT DOCUMENTS

| | | | | |
|---|---|---|---|---|
| 3,586,086 | A * | 6/1971 | Boileau | 152/209.23 |
| 4,299,264 | A * | 11/1981 | Williams | 152/209.18 |
| 4,446,901 | A * | 5/1984 | Endo et al. | 152/209.24 |
| 5,407,005 | A * | 4/1995 | Consolacion et al. | 152/209.9 |
| 5,529,101 | A * | 6/1996 | Croyle et al. | 152/209.24 |
| 7,163,039 | B2 * | 1/2007 | Boiocchi et al. | 152/209.8 |
| 2010/0096053 | A1* | 4/2010 | Nagai | 152/209.9 |
| 2010/0200134 | A1* | 8/2010 | Murata | 152/209.9 |
| 2011/0100521 | A1* | 5/2011 | Sakamoto | 152/209.24 |
| 2012/0042998 | A1* | 2/2012 | Ueda | 152/209.18 |
| 2013/0112325 | A1 | 5/2013 | Mukai | |

* cited by examiner

*Primary Examiner* — Eric Hug
(74) *Attorney, Agent, or Firm* — David L. King

(57) ABSTRACT

A pneumatic tire comprises an annular tread portion including a plurality of circumferentially extending main grooves comprising an innermost groove, an outermost groove, and at least one middle groove arranged between the innermost groove and the outermost groove. The outermost groove comprises an inner sidewall, an outer sidewall, a groove bottom, and a groove opening opposite to the groove bottom, wherein the outermost groove has an asymmetric cross section with respect to any straight line perpendicular to the groove opening, and wherein the outer sidewall of the outermost groove is tilted by more than 20° with respect to a straight line perpendicular to the groove opening.

22 Claims, 6 Drawing Sheets

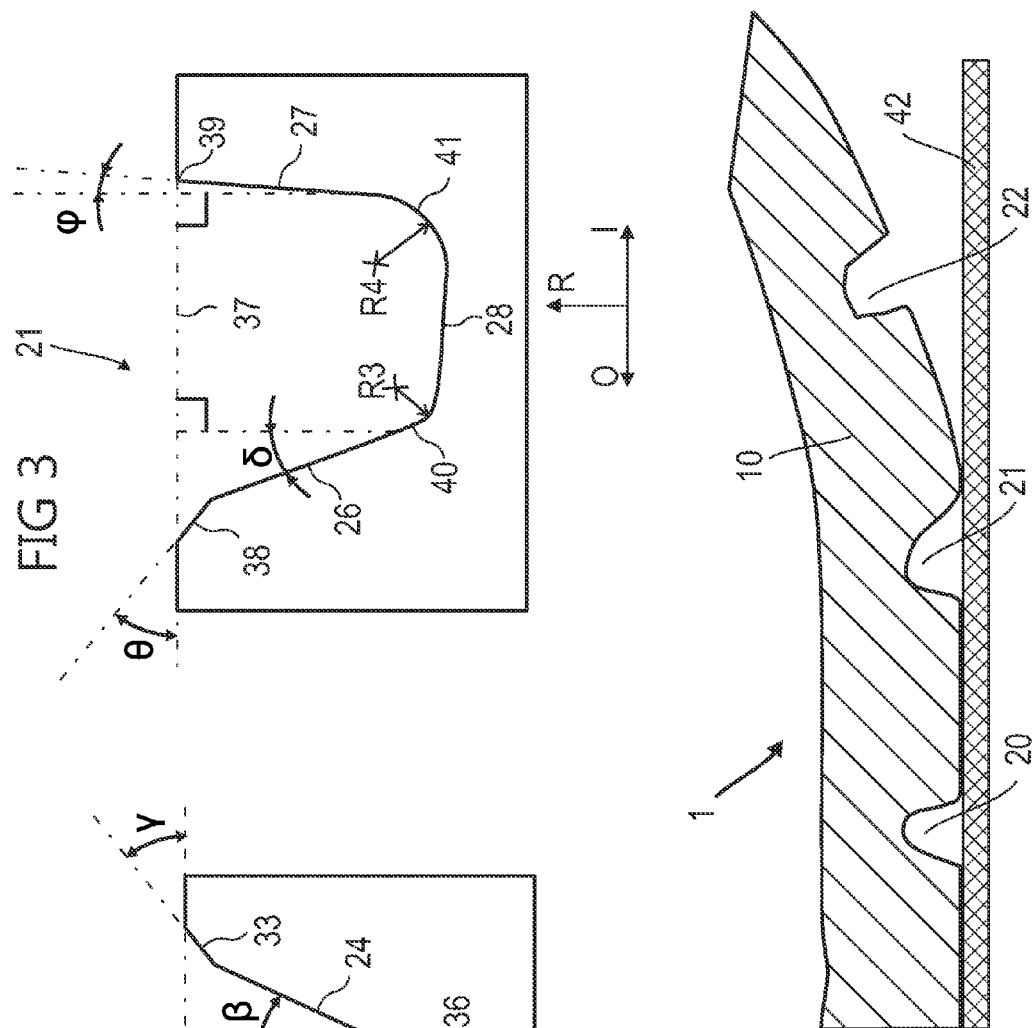

TIRE COMPRISING A TREAD WITH ASYMMETRIC GROOVE PROFILES

TECHNICAL FIELD

The invention relates to a pneumatic tire. More particularly, the invention relates to a pneumatic tire comprising an asymmetric tread pattern and/or at least one asymmetric groove.

BACKGROUND OF THE INVENTION

In order to improve wet handling, pneumatic tires are provided with grooves in their treads, wherein increased groove cross sections may increase the tire's drainage capacity. Unfortunately, grooves may negatively influence the tire's steering stability and grip. Indeed, during cornering, grooves of known tires may be subjected to buckling and tread portions laterally adjacent to these grooves may be raised from the road's surface such that they no longer contact the road.

In dry conditions, this phenomenon impairs the adherence contact between the road and the tire, and may result in a loss of control when making sudden maneuvers at high speed. In particular, typical tire grooves may have high stress concentrations and undergo buckling during heavy handling of a tire resulting in limited dry performances. Moreover, in wet conditions, the groove's cross sectional area may be reduced, thereby impeding its drainage capacity.

Document US 2013/0112325 A1 discloses a pneumatic tire with an asymmetric tread portion. The tread portion is provided with circumferentially extending grooves having tilted sidewalls. The outermost groove has sidewall cross sections or profiles with different tilts in respect of a line perpendicular to the tread. The other grooves show sidewall cross sections which are more tilted than the counterparts of the outermost groove. This arrangement is intended to maintain a safe cornering stability and also a low noise level. However, in particular cornering stability may still be improved, especially at high speed on a vehicle having a non-zero, positive camber angle.

It may be one object of the present invention to overcome at least one of the afore-mentioned disadvantages. Another object of the present invention may consist in increasing the cornering stability or stiffness of a pneumatic tire. Yet another object of the present invention may consist in providing enhanced dry and wet performances of high performance and ultra high performance tires. A further object of the invention may consist in improving the local stiffness of a tire's tread near the tire's main grooves during a cornering maneuver, preferably without significant trade-offs in wet handling.

SUMMARY OF THE INVENTION

A pneumatic tire comprises an annular tread portion, for example an asymmetric tread, including a plurality of circumferentially extending main grooves comprising an innermost groove, an outermost groove, and at least one middle groove arranged between the innermost groove and the outermost groove, wherein the outermost groove comprises an inner sidewall, an outer sidewall, a groove bottom, and a groove opening opposite to the groove bottom, and wherein the outermost groove has an asymmetric cross section or profile with respect to any straight line perpendicular to the groove opening. Further, the outer sidewall of the outermost groove is tilted by more than 20° with respect to a straight line perpendicular to the groove opening. The circumferentially extending main grooves may extend in a circumferential direction over at least portion of the tire's circumference. In other words, they may be either discontinuous or continuous grooves.

In particular, the outermost groove may have an asymmetric cross section or profile with respect to a straight line perpendicular to the groove opening and passing through the middle or center of the groove opening with respect to the axial direction.

According to a first aspect, the outer sidewall and the inner sidewall are tilted with respect to each other by at least 40°, preferably by at least 60°.

According to another aspect, the outer sidewall is tilted by between 25° and 40°, preferably by between 30° and 35°, with respect to the straight line perpendicular to the groove opening.

According to another aspect, the pneumatic tire may be a directional or unidirectional tire. However, the tire may also be a symmetric or asymmetric tire.

In a further aspect, the outer sidewall and the inner sidewall of at least one of the grooves are asymmetric in respect of any straight line perpendicular to the groove opening.

According to another aspect, the tread portion has radially outer tread surface, intended to contact the ground when the tire is rolling, wherein the outermost groove contacts the tread surface on one side via an edge or discontinuous edge and on another side via a chamfer.

According to yet another aspect, the outermost groove contacts the tread surface on an axially outer side via the edge, and on an axially inner side via the chamfer extending between the inner sidewall and the groove opening.

According to another aspect, the chamfer is tilted with respect to the groove opening of the outermost groove by an angle of between 10° and 45°, preferably by an angle of between 20° and 35°, and wherein the height of the chamfer is between 10% and 25% of the maximum depth of the outermost groove, and wherein the width of the chamfer is about 10% to 20% of the width of the groove opening.

According to a further aspect, the cross section or the cross sectional area of each groove tapers in a radially inner direction. In other words, both sidewalls of each groove taper with respect to each other in a radially inner direction.

In another aspect, the width of the groove opening is between 1.15 times and 4 times larger than the width of the groove bottom.

In another aspect, the outermost groove is closer to an equatorial plane of the tire than the innermost groove. Thus, the arrangement of the tread's grooves is asymmetric.

According to another aspect, the circumferential main grooves are asymmetrically arranged in respect of the equatorial plane of the tire.

According to another aspect, each main groove defines or has a cross sectional area, wherein the cross sectional area of the outermost groove is smaller than the cross sectional area of at least one of the innermost groove and the middle groove.

According to another aspect, the hydraulic diameter of the outermost groove is smaller than the hydraulic diameter of at least one of the innermost groove and the middle groove. As common in the present technical field, the hydraulic diameter (Hd) may be defined as: $Hd = 4*A/P$, wherein A is the cross sectional area of the groove and P is the wetted perimeter of the groove, i.e. the length of the groove's perimeter (e.g. the sum of the lengths of the groove bottom, the groove sidewalls, the groove opening and chamfers if any).

According to another aspect, the ratio of the hydraulic diameter of the outermost groove to the hydraulic diameter of one of the other grooves is between 0.1 and 1.0; and/or wherein the ratio of the hydraulic diameter of the innermost groove to the hydraulic diameter of the middle groove is between 0.5 and 2.0.

According to another aspect, the outer sidewall is at least two times or at least four times more tilted in respect of a straight line perpendicular to the groove opening than the inner sidewall.

According to another aspect, the sidewalls extend over the majority of the depth, as for instance over at least 75% of the depth of the outermost groove. For example, the sidewalls may extend from the groove bottom to an adjacent rib or shoulder portion of the tread portion.

In general, the main grooves may be laterally separated from each other by circumferential ribs of the tread portion.

According to another aspect, the outermost groove comprises joining portions, comprising an inner joining portion joining the groove bottom with the inner sidewall and an outer joining portion joining the groove bottom with the outer sidewall, said joining portions being one of straight and curved.

According to another aspect, the joining portions are curved and the outer joining portion comprises a larger radius than the inner joining portion.

According to another aspect, the groove bottom and the groove opening of the outermost groove are tilted in respect of each other and taper with respect to each other in an axially outer direction.

According to another aspect, the groove bottom of the outermost groove comprises or consists of an essentially straight portion which is tilted with respect to the corresponding groove opening by more than 5°, preferably by between 10° and 25°.

According to another aspect, the innermost groove comprises a further groove opening, a further outer sidewall and a further inner sidewall that is more tilted in respect of a straight line perpendicular to the groove opening of the innermost groove than the outer sidewall of the innermost groove.

According to another aspect, the inner sidewall of the innermost groove is tilted by between 25° and 40°, and preferably by between 30° to 40°, with respect to a straight line perpendicular to the groove opening of the innermost groove.

According to another aspect, the outer sidewall of the innermost groove is tilted by between 1° and 10°, and preferably by between 2° and 7° with respect to a straight line perpendicular to the groove opening of the innermost groove.

According to another aspect, an outer sidewall of the middle groove is tilted by between 25° and 40°, and preferably by between 30° and 40° with respect to a straight line perpendicular to a groove opening of the middle groove.

According to yet another aspect, an inner sidewall of the middle groove is tilted by between 1° and 10°, and preferably by between 2° and 7° with respect to a straight line perpendicular to a groove opening of the middle groove.

According to another aspect, at least one of the middle grooves has an essentially semi-circular cross section.

According to another aspect, at least one of the middle grooves comprises a groove opening, an inner sidewall and an outer sidewall that is more tilted in respect of a straight line perpendicular to the groove opening of the middle groove than the inner sidewall of the middle groove. Further, the middle groove may have an asymmetric cross section or profile essentially corresponding to the mirrored cross section or profile of the innermost groove mentioned above.

According to another aspect, the tire comprises a combination of the aforementioned tilts of the outermost groove's sidewalls, the middle groove's sidewalls and the innermost groove's sidewalls.

According to another aspect, the middle groove comprises a chamfer arranged between an axially outer sidewall and a groove opening of the middle groove. The chamfer of the middle groove may be tilted with respect to the groove opening of the middle groove by an angle of between 10° and 45°, preferably by an angle of between 20° and 35°, and wherein the height of the chamfer is between 5% and 15% of the maximum depth of the middle groove, and wherein the width of the chamfer is about 5% to 15% of the width of the groove opening.

According to another aspect, the innermost groove comprises a chamfer arranged between an axially inner sidewall and a groove opening of the innermost groove. The chamfer of the innermost groove may be tilted with respect to the groove opening of the middle groove by an angle of between 10° and 45°, preferably by an angle of between 20° and 35°, and wherein the height of the chamfer is between 5% and 15% of the maximum depth of the innermost groove, and wherein the width of the chamfer is about 5% to 15% of the width of the groove opening.

The above aspects and features of the disclosure of the invention may be combined with or replaced by one another.

Advantages of the tire according to the present invention may consist in an increased tread or groove stiffness during cornering maneuvers and may help to reduce especially groove buckling of the outermost groove. Shaping the innermost and middle grooves in accordance with aspects of the present invention may further increase the stiffness and reduce buckling of those during cornering maneuvers. In particular, the outermost, and optionally also the middle grooves and/or the innermost groove may be provided with asymmetric cross sections or profiles, such that they become less asymmetric or more symmetric under cornering conditions. Thus, the specific shape of the grooves may increase the stiffness of the tread adjacent the grooves under cornering maneuvers.

DEFINITIONS

"Apex" or "Bead Filler Apex" means an elastomeric filler located radially above the bead core and between the plies and the turn-up plies.

"Axial" and "Axially" mean the lines or directions which are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Camber angle" or "camber" means an angle between the equatorial plane of the tire and a line perpendicular to the road. This angle is positive when the upper portion of the tire is tilted outwardly when mounted to the vehicle, and negative when the upper portion of the tire is tilted inwardly.

"Carcass" means the tire structure apart from the belt structure, tread, undertread, and sidewall rubber over the plies, but including the beads.

"Circumferential" means lines or directions extending along or in parallel to the perimeter of the surface of the annular tread perpendicular to the axial direction.

"Cross section" means in the present application a cross section following or lying in a plane which extends along the axial direction and the radial direction of the tire. A "cross section" with regard to the tread or its components, as for instance its grooves, may also be considered as the profile of the tread or its components.

"Equatorial plane" means the plane perpendicular to the tire's axis of rotation and passing through the center of its tread; or the plane containing the circumferential centerline of the tread.

"Groove" means an elongated void area in a tread that may extend circumferentially. A groove width or depth may be equal to its average width or depth over its length.

"Inboard" means a direction axially oriented toward a center of the vehicle.

"Inner" means, if not otherwise defined, an inner axial direction.

"Lateral" means a direction parallel to the axial direction.

"Normal Load" means the specific design inflation pressure and load assigned by the appropriate standards organization for the service condition for the tire.

"Outboard" means a direction axially oriented away from the center of the vehicle.

"Outer" means, if not otherwise defined, an outer axial direction.

"Overlay" means a ply arranged radially on the top of the belt or belt plies. Such overlays are often used for reinforcement of high-speed tires.

"Radial" and "radially" mean directions radially toward or away from the axis of rotation of the tire. In connection with "inner" or "outer" it refers to the tire axis.

"Sidewall" means that portion of a tire between the tread and the bead, or, in the context of the present disclosure, also a lateral boundary of a tread groove.

"Slip angle" or "slip" means the angle between a rolling tire's direction of travel and the orientation of the equatorial plane of the tire.

"Tread" or "Tread portion" means one or more rubber components which when bonded to a tire carcass include that portion of the tire that comes into contact with the road when the tire is normally inflated and under normal load.

"Tread width" means the arc length of the tread surface in the plane including the axis of rotation of the tire.

"Undertread" means a layer of rubber placed under an extruded tread to boost adhesion of the tread to the stabilizer plies during tire assembly and preferably to cover the end of the cut belts.

BRIEF DESCRIPTION OF THE DRAWINGS

The structure, operation, and advantages of the invention will become more apparent upon contemplation of the following description taken in conjunction with the accompanying drawings, wherein:

FIG. 2 represents a schematic cross section of an outermost groove of the tire according to FIG. 1;

FIG. 3 represents a schematic cross section of a middle groove of the tire according to FIG. 1;

FIG. 4 schematically represents a cross section of the tire tread according to FIG. 1 during a cornering maneuver;

DETAILED DESCRIPTION OF THE EMBODIMENTS

Figure 1:
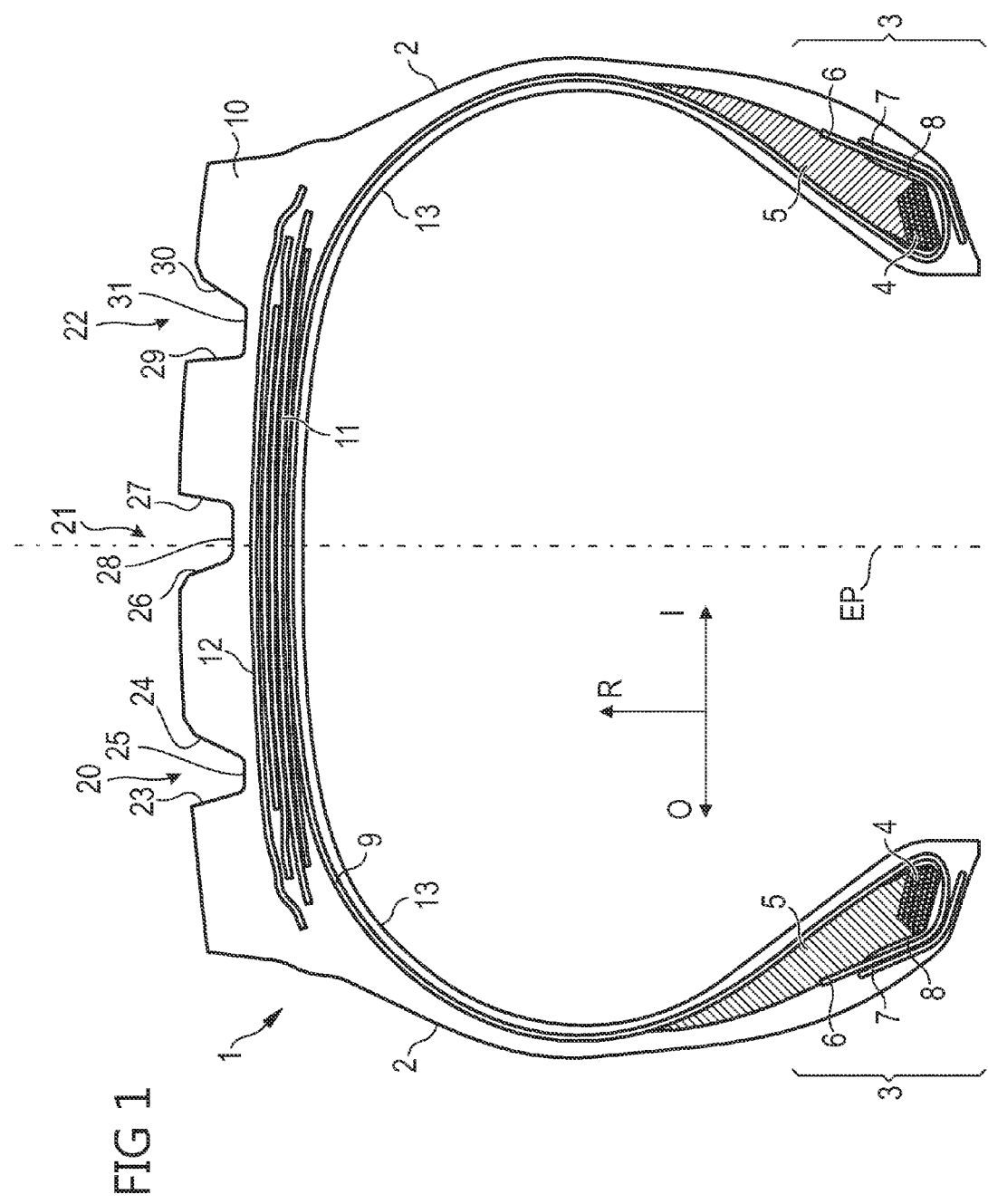
FIG. 1 represents a schematic cross section through a pneumatic tire comprising a tread with asymmetric grooves according to a first embodiment of the present invention.

FIG. 1 shows a schematic cross section of a pneumatic tire 1 according to a first embodiment of the invention. The pneumatic tire 1 has a tread 10, an inner liner 13, a belt structure 12 comprising belts or belt plies 11, a carcass ply 9, two tire side walls 2, and two bead regions 3 comprising bead filler apexes 5 and beads 4. The example tire 1 may be suitable, for example, for mounting on a rim of a vehicle, as e.g. a passenger car or truck. The depicted exemplary tire can be directional or not. Further, the tire 1 may comprise a generally asymmetric or symmetric tread 10 in respect of the equatorial plane EP, with the tread 10 extending between an inner tire side wall 2 intended to be disposed at an inboard mounting position and an outer tire side wall 2 intended to be disposed at an outboard mounting position. The carcass ply 9 includes a pair of axially opposite end portions 6, each of which is secured to a respective one of the beads 4. Each axial end portion 6 of the carcass ply 9 is turned up and around the respective bead 4 to a position sufficient to anchor each axial end portion 6. The carcass ply 9 may be a rubberized ply having a plurality of substantially parallel carcass reinforcing members made of such material as polyester, rayon, or similar suitable organic polymeric compounds. The turned up portions 6 of the carcass ply 9 may engage the axial outer surfaces of two flippers 8 and axial inner surfaces of two chippers 7. The main portion of the tread 10 may be formed of a tread compound, which may be any suitable tread compound or compounds. It is emphasized that the present invention is however not limited to a tire design as described above.

As shown in FIG. 1, the example tread 10 may have three circumferentially extending main grooves 20, 21, 22, each groove generally defining a U-shaped opening in the tread 10. The main grooves 20, 21, 22 comprise an axially outermost or outboard groove 20, an axially innermost or inboard groove 22, and at least one middle groove 21 disposed between the outermost groove 20 and the innermost groove 22. In FIG. 1, the axially inner direction is indicated by the direction I, whereas the axially outer direction is indicated by the direction O. A radially outer direction is indicated by the direction R. The tread 10 may also comprise auxiliary circumferentially extending grooves (not shown) which are disposed between or beside main grooves 20, 21, 22. Auxiliary grooves are generally less wide and/or less deep than the main grooves. Each of the main grooves may be at least twice as wide and/or at least twice as deep as each of the auxiliary grooves.

Each main groove 20, 21, 22 may comprise a cross section with a groove bottom or base 25, 28, 31 laterally separating a pair of essentially radially extending sidewalls 23, 24, 26, 27, 29, 30, and a groove opening essentially opposite to the groove bottom 25, 28, 31. In other words, the groove opening may be considered as lying in a plane of the tread's surface which contacts the ground when driving. Alternatively, the groove opening's cross section or profile may be considered as a straight line extending between the radially outer surfaces of two circumferential ribs forming the sidewalls of or delimiting the respective groove 20, 21, 30. Each sidewall 23, 24, 26, 27, 29, 30 may extend over the majority of the groove's depth and the main grooves 20, 21, 22 generally increase their width in a radially outer direction R.

The groove bottom 25, 28, 31 may extend axially over the majority of the maximum width of the corresponding groove 20, 21, 22. However, in other examples, a groove bottom may be optional. For example, the sidewalls of a groove could laterally meet in just one point.

FIG. 2 represents a schematic cross section of the outermost groove 20 of the tread 10 according to FIG. 1.

Each sidewall 23, 24 of the outermost groove 20 is tilted with respect to a straight line perpendicular to the groove opening 32. They may be tilted by equal or different angles α, β in opposite directions. In the depicted example, both sidewalls 23, 24 are tilted by an angle of about 20°. However, the both sidewalls 23, 24 may preferably be tilted by between 25° and 40°, and even more preferably by between 30° and 35°.

As shown in FIG. 2, the outermost groove 20 may comprise a chamfer 33 at a radially outer end of the inner sidewall 24 which is tilted with respect to the groove opening 32 by an angle γ comprised between 10° and 45°, preferably comprised between 20° and 35°. The height of that chamfer 33 may, for example, be between 10% and 25% of the maximum depth of the groove 20, and the width of the chamfer 33 may, for example, be between 10% and 20% of the cross sectional width of groove opening 32. On the axially opposite side of the groove 20 (opposite to the chamfer 33), the groove has a discontinuous edge 34 intended to contact the road when driving.

The groove bottom 25 may be tilted with respect to the groove opening 32 such as to reduce the depth of the outboard groove 20 in an axially outer direction.

In the depicted embodiment, the outermost groove's cross section further comprises joining portions 35, 36 joining the groove bottom 25 with the inner sidewall 24 and the outer sidewall 23. The joining portions 35, 36 may be straight, or may be curved and comprise an axially outer joining portion 35 with a radius of curvature R1, and an axially inner joining portion 36 with a radius of curvature R2 inferior to R1. Preferably, the radius of curvature R1 is at least twice the radius of curvature R2.

FIG. 3 shows a schematic cross section of the middle groove 21 of the tread 10 according to FIG. 1.

Each sidewall 26, 27 of the middle groove 21 is tilted with respect to a straight line perpendicular to the groove opening 37. The inner sidewall 27 is tilted by an angle φ comprised between 1° and 20°, preferably between 1° and 10°. The outer sidewall 26 is tilted by an angle δ comprised between 25° and 40°, preferably between 30° and 40°. In other words, the outer sidewall 26 is more tilted than the inner sidewall 27.

Further, the middle groove 21 comprises a chamfer 38 at the radially outer end of the outer sidewall 26, which is tilted with respect to the groove opening 37 by an angle θ of between 10° and 45°, preferably by an angle θ of between 20° and 35°, and wherein the height of the chamfer is between 5% and 15% of the maximum depth of the middle groove. The cross sectional width of the chamfer may be about 5% to 15% of the width of the groove opening. On the axially opposite side of the groove 21, instead of a chamfer, the groove includes an edge 39 intended to contact the road.

The groove bottom 28 of the middle groove may also be tilted with respect to the groove opening 37 such as to reduce the depth of the middle groove 21 in an outboard direction. However, as for the outer groove 20, such a feature is not to be considered as an essential feature. Nevertheless, it may further improve the groove stiffness during a cornering maneuver.

Similar to the outer groove, the middle groove 21 may comprise joining portions 40, 41 joining the groove bottom 28 with the inner sidewall 27 and the outer sidewall 26. The joining portions 40, 41 may be straight, or may be curved. A curved outer joining portion 40 may have a first radius of curvature R3, and an inner joining portion 41 may have a second radius of curvature R4 superior to R3. For example, the radius of curvature R4 may be at least twice times the radius of curvature R3.

The innermost groove 22, which is depicted in FIG. 1, may be generally symmetric to the middle groove 21 (as shown in FIG. 3) with respect to a plane perpendicular to the axis of the tire 1. In other words, the cross section of the innermost groove 22 may substantially correspond to the mirrored cross section of the middle groove 21. In particular, the innermost groove 22 may comprise from outboard to inboard, an outer sidewall 29, an outer joining portion, a groove bottom 31, an inner joining portion, an inner sidewall 30, and a chamfer with similar or equal angles, similar or equal lengths or radii of curvature as mentioned with respect to the middle groove 21. In general, the terms "similar" or "about" may be understood as a variation of a value of less than 20%, preferably less than 5%.

In the present embodiment, the width of the middle groove 21 is larger than the width of the outermost groove 20. In other words, the cross sectional area of the middle groove 21 is larger than the cross sectional area of the outermost groove 20. Such a feature may further improve the stability of the tire under cornering maneuvers. However, the width and/or the cross sectional are of the grooves 20, 21, 22 may also be equal.

FIG. 4 shows a schematic cross section of an example deformation of a portion of the pneumatic tire 1 according to the first embodiment of the invention during an inboard cornering maneuver with respect to said tire 1.

As a non-limiting example, the pneumatic tire 1 may be a 205/55R16 tire, under a load of about 8000N, and inflated at about 2.7 bar. The tire may be mounted to a vehicle with a camber angle of about +4°. The speed of the cornering maneuver may be about 50 km/h, and the resulting slip angle may be about −8°.

Under such exemplary conditions, the cross section of the tread 10 is bent, wherein its inner portion is curved and separated from the road 42 such that the innermost groove 22 is raised from the road's surface, whereas a portion of the outer tire sidewall contacts the road 42. The outermost groove 20 and the middle groove 21 are deformed with respect to the shape depicted in FIG. 1. In particular, the chamfer of the outermost groove 20 is distorted and contacts at least partially the road 42. Thus, the features of the described embodiment may increase the available gripping surface and permit the inner sidewall to counter tilt in a direction opposite to the cornering direction. Simultaneously, the outer groove sidewalls turn and become less tilted with respect to the lines perpendicular to their respective groove openings. The groove bottom of the outermost groove 20 may also turn and reduce its angle with respect to the groove opening. The middle groove 21 is distorted in an outboard direction and becomes generally more symmetric with respect to a centerline perpendicular to its groove opening. The same applies to the outermost groove 20. This increased symmetry achieved during the cornering maneuver may on the one hand maintain the tire's drainage capacity or wet-handling performance and on the other hand, increase the local stiffness of the tread near the grooves and the cornering stiffness of the tire.

Figure 5:
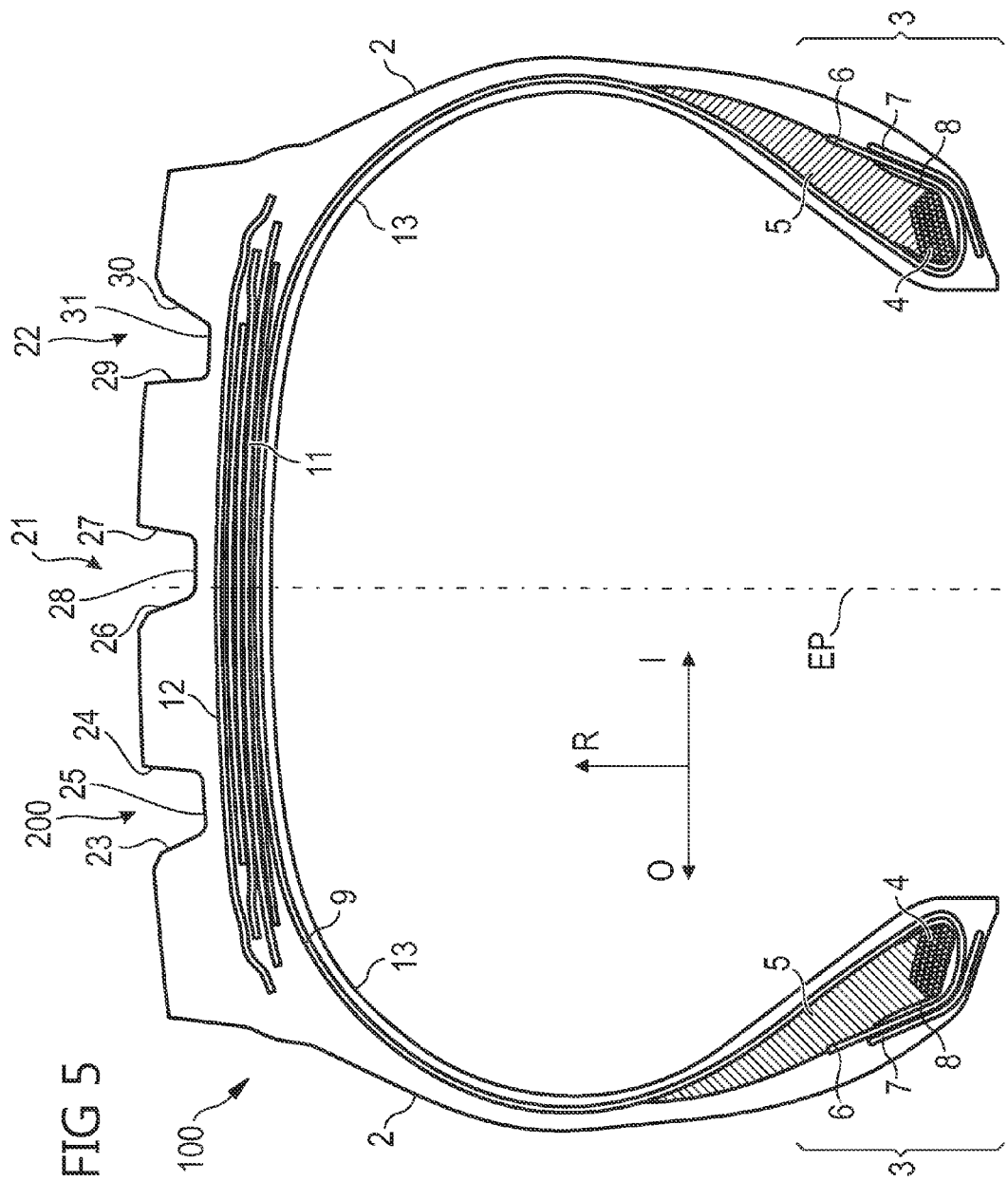
FIG. 5 represents a schematic cross section through a pneumatic tire comprising a tread with asymmetric grooves according to a second embodiment of the present invention.

FIG. 5 shows a schematic cross section of a pneumatic tire 100 according to a second embodiment of the invention. The pneumatic tire 100 according to the second embodiment corresponds essentially to the pneumatic tire 1 according to the first embodiment of the invention; however the geometries of their main grooves differ in detail. For the sake of an increased intelligibility, the same reference signs as used for tire 1 in FIGS. 1 to 4 are used for the elements of tire 100 in FIG. 5.

The middle groove 21 and the innermost groove 22 are similar or equal to the respective grooves 21 and 22 according to the first embodiment of the invention. However, in contrast to the embodiment depicted in FIG. 1, the outermost groove 200 and the middle groove 21 of the tire 100 have outer sidewalls 23, 26 with a similar tilt angle. The same applies to the inner sidewalls 24, 27 of these grooves 200, 21. Thus, the chamfer, the tilt of the inner sidewall and the tilt of the outer sidewall of the outermost groove 200 according to FIG. 5 corresponds to the chamfer, the tilt of the inner sidewall and the tilt of the outer sidewall of the middle groove 21 according to the embodiment described in FIGS. 1 to 4 with the values and ranges mentioned with respect to these Figures.

Figure 6:
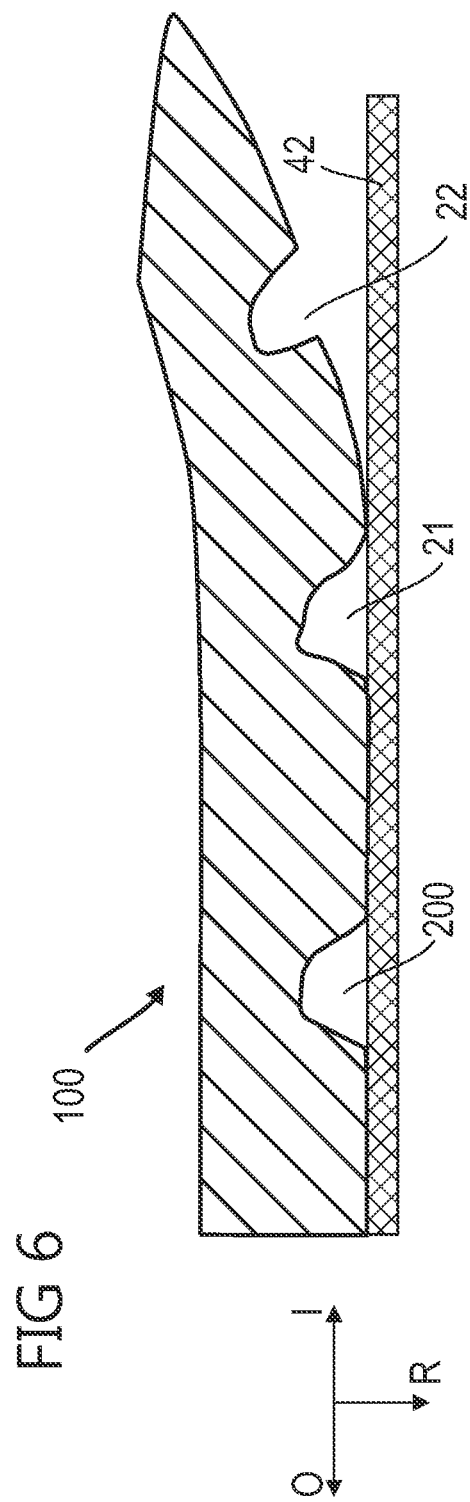
FIG. 6 schematically represents a cross section of the tire tread according to FIG. 5 during a cornering maneuver.

FIG. 6 shows a schematic cross section of the deformation of a portion of the pneumatic tire 100 according to the second embodiment of the invention as depicted in FIG. 5 during a simulation of an inboard cornering maneuver with respect to said tire 100.

The conditions of that maneuver may be the same as mentioned with respect to FIG. 4 which result in a bent shape of the tread as schematically depicted in FIG. 6. The tread's inner portion is curved and separated from the road 42 such that the innermost groove 22 quits the road's surface, whereas a portion of the outer tire sidewall contacts the road 42. The outermost groove 200 and the middle groove 21 are distorted or deformed. The chamfer of the outermost groove 200 is also distorted or deformed and contacts the road 42. As in the first embodiment, the features according to the embodiment of FIGS. 5 and 6 may increase the available surface gripping the road 42 and may result in a local stiffness increase.

Figure 7:
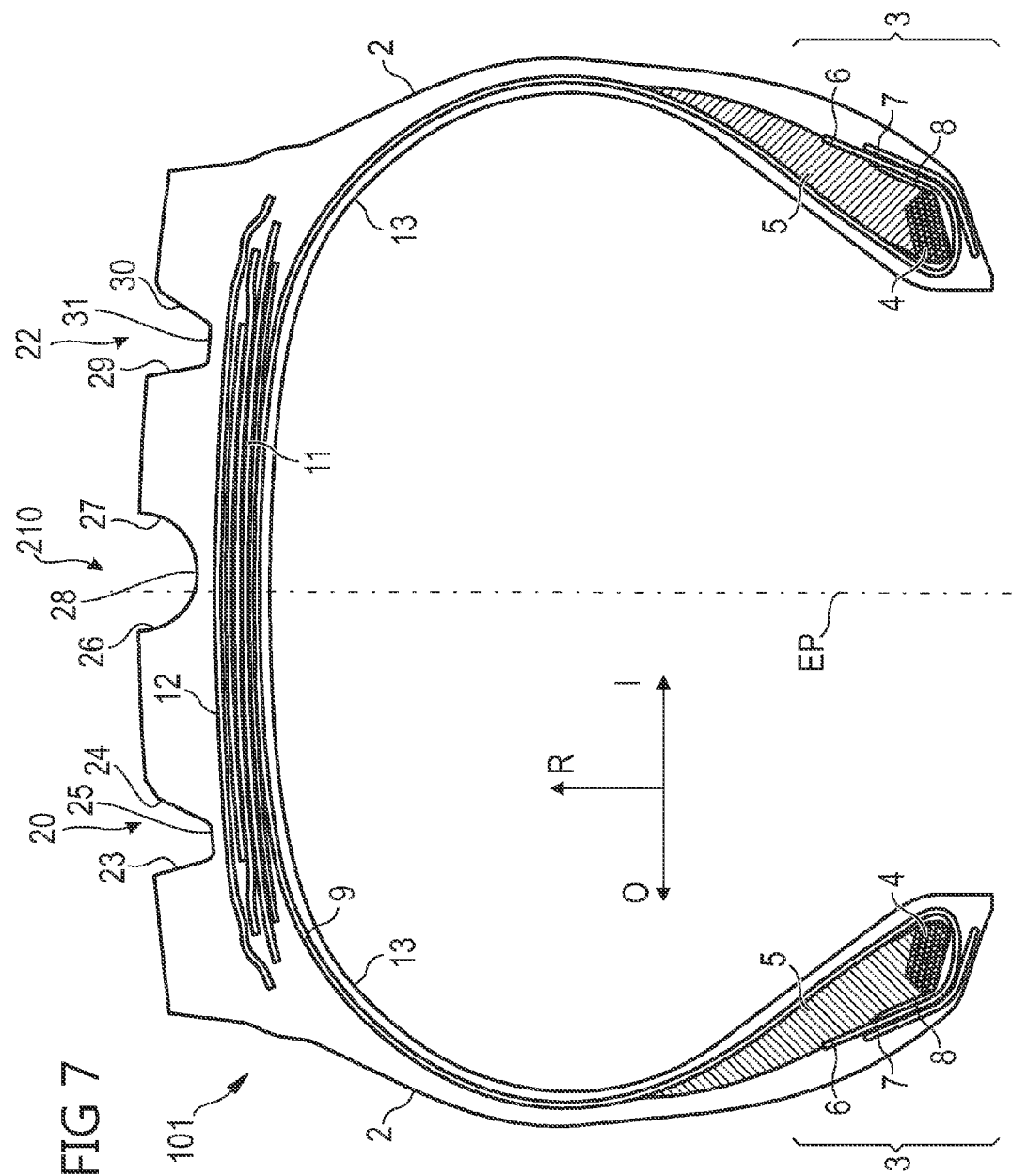
FIG. 7 represents a schematic cross section through a pneumatic tire comprising a tread with asymmetric grooves according to a third embodiment of the present invention.

FIG. 7 shows a schematic cross section of a pneumatic tire 101 according to a third and non-limiting embodiment of the invention. The pneumatic tire 101 according to the third embodiment is similar to the pneumatic tire 1 according to the first embodiment of the invention. However, the geometries of their middle grooves differ. For the sake of an improved intelligibility, the same reference signs are used for the elements of tire 101 as in the previous Figures. The same applies to the tire 111 depicted in FIG. 8.

According to FIG. 7, the outermost groove 20 and the innermost groove 22 may be substantially similar or equal to the outermost groove 20 and the innermost groove 22 of the first embodiment of the invention as depicted in FIG. 1. However, the middle groove 210 as depicted in FIG. 7 has a semi-circular cross section. The groove opening may be wider than the groove opening of the outermost groove 20 and of the innermost groove 22.

The depicted semi-circular middle groove 210 may further improve the tire's cornering force or lateral force under cornering maneuvers, such as in the maneuver already described above, and especially in case of high slip angles.

Figure 8:
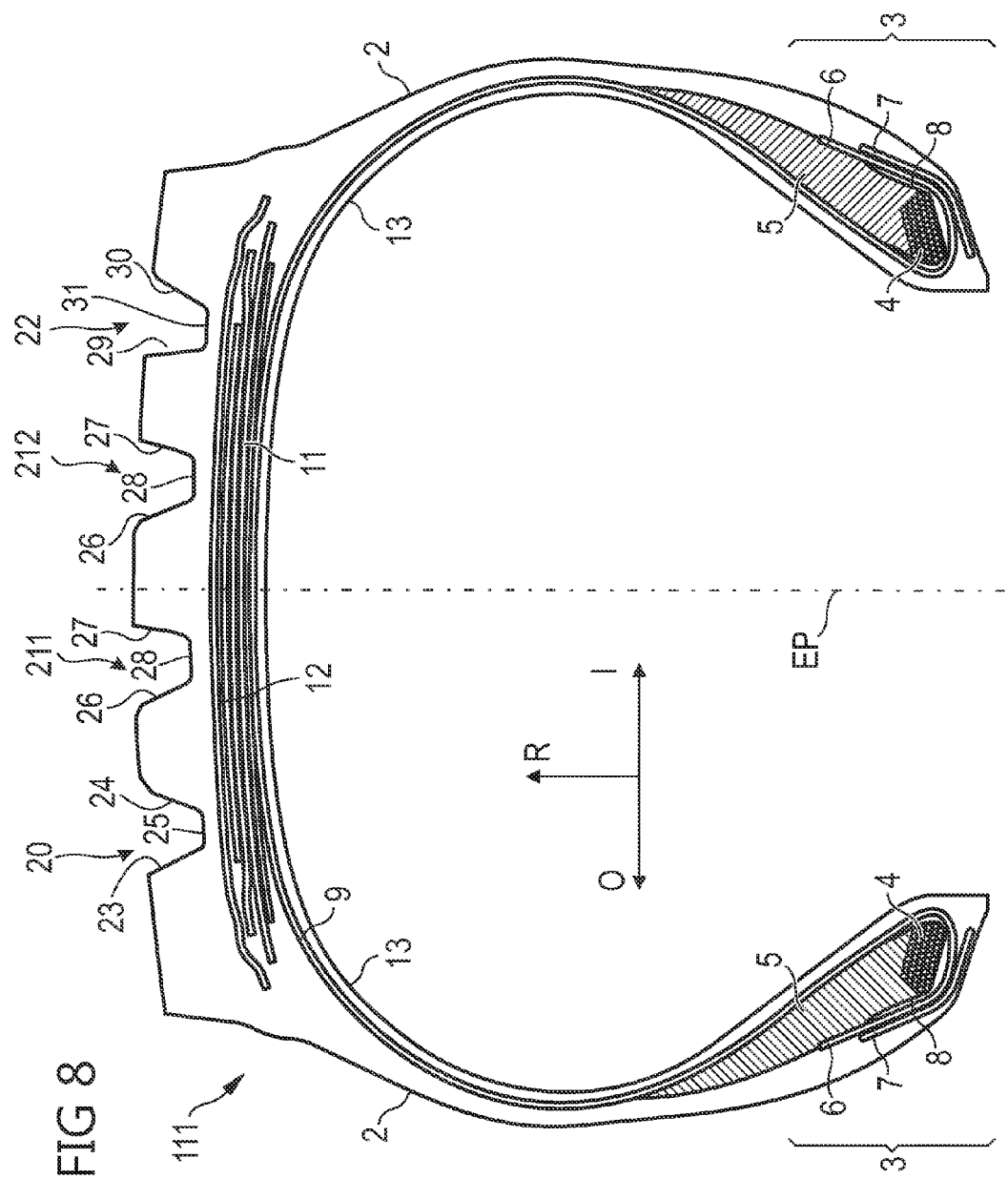
FIG. 8 represents a schematic cross section through a pneumatic tire comprising a tread with asymmetric grooves according to a fourth embodiment of the present invention.

FIG. 8 shows a schematic cross section of a pneumatic tire 111 according to a fourth embodiment of the invention. The pneumatic tire 111 according to the fourth embodiment is similar to the pneumatic tire 1 according to the first embodiment of the invention; however the geometries of their middle grooves and the number of middle grooves differ. In particular, the tire 111 has four circumferentially extending main grooves 20, 211, 212, 22, generally defining a U-shaped opening in the tread 10. The main grooves 20, 211, 212, 22 comprise an outermost groove 20, an innermost groove 22, and two middle grooves 211, 212 disposed between the outermost groove 20 and the innermost groove 22. Each middle groove 211, 212 may comprise, from outboard to inboard, an outer sidewall 26, a groove bottom 28, and an inner sidewall 27.

The inner middle groove 212 may be mirror symmetrical to the outermost groove 22. The outer middle groove 211 may be generally similar or equal to the middle groove 212.

In general and in addition to the above described features, it is possible to further reinforce at least the bottom of one or more grooves in order to further improve the groove stiffness under cornering conditions and/or to reduce groove buckling. Such reinforcements are for example disclosed in U.S. patent application Ser. No. 13/611,326 filed on 12 Sep. 2012 which is incorporated herein by reference. The combination of groove bottom reinforcements and the groove designs mentioned herein may further improve the groove stiffness and handling performance of the tire, in particular reduce trade-offs in wet handling performance.

While certain representative embodiments, examples and details have been shown for the purpose of illustrating the subject invention, it will be apparent to those skilled in this art that various changes and modifications can be made therein without departing from the scope of the subject invention as defined by the following appended claims.

In any case the above described embodiments and examples shall not be understood in a limiting sense. In particular, features of the above embodiments may also be replaced by one another or combined with one another.

The invention claimed is:

1. A pneumatic tire comprising:
an annular tread portion including a plurality of circumferentially extending main grooves comprising an innermost groove, an outermost groove, and at least one middle groove arranged between the innermost groove and the outermost groove, the outermost groove comprising an inner sidewall, an outer sidewall, a groove bottom, and a groove opening opposite to the groove bottom, wherein the outer sidewall and the inner sidewall are tilted with respect to each other by at least 40°;
wherein the outermost groove has an asymmetric cross section with respect to any straight line perpendicular to the groove opening, and wherein the outer sidewall of the outermost groove is tilted by more than 20° with respect to a straight line perpendicular to the groove opening; and
wherein the tread portion has a radially outer tread surface, and wherein the outermost groove, the middle groove and the innermost groove contact the tread surface on one side via an edge, and on another side via a chamfer, wherein the outermost groove contacts the tread surface on an axially outer side via the edge and on an axially inner side via the chamfer extending between the inner sidewall and the groove opening, wherein the innermost groove contacts the tread surface on an axially inner side via the chamfer extending between the inner sidewall and the groove opening, and on an axially outer side via the edge, and the middle groove contacts the tread surface on an axially outer side via the chamfer extending between the outer sidewall and the groove opening and on an axially opposite side of the groove via an edge.

2. The pneumatic tire according to claim 1, wherein at least one of the inner sidewall and the outer sidewall is tilted by between 25° and 40° with respect to the straight line perpendicular to the groove opening.

3. The pneumatic tire according to claim 1, wherein the outer sidewall and the inner sidewall are asymmetric in respect of any straight line perpendicular to the groove opening.

4. The pneumatic tire according to claim 1, wherein the chamfer is tilted with respect to the groove opening of the outermost groove by an angle of between 10° and 45° and wherein the height of the chamfer is between 10% and 25% of the maximum depth of the outermost groove and wherein the width of the chamfer is about 10% to 20% of the width of the groove opening.

5. The pneumatic tire according to claim 1, wherein a cross sectional area of each groove tapers in a radially inner direction.

6. The pneumatic tire according to claim 1, wherein the width of the groove opening is between 2 times and 4 times larger than the width of the groove bottom.

7. The pneumatic tire according to claim 1, wherein the outermost groove is closer to an equatorial plane of the tire than the innermost groove.

8. The pneumatic tire according to claim 1, wherein each main groove defines a cross sectional area, and wherein the cross sectional area of the outermost groove is smaller than the cross sectional area of at least one of the innermost groove and the middle groove.

9. The pneumatic tire according to claim 1, wherein a hydraulic diameter of the outermost groove is smaller than the hydraulic diameter of at least one of the innermost groove and the middle groove.

10. The pneumatic tire according to claim 9, wherein the ratio of the hydraulic diameter of the outermost groove to the hydraulic diameter of at least one of the innermost and middle grooves is between 0.1 and 1.0.

11. The pneumatic tire according to claim 10, wherein the ratio of the hydraulic diameter of the innermost groove and the hydraulic diameter of the middle groove is between 0.5 and 2.0.

12. The pneumatic tire according to claim 1, wherein the outer sidewall is at least two times more titled in respect of a straight line perpendicular to the groove opening than the inner sidewall.

13. The pneumatic tire according to claim 1, wherein the sidewalls extend over at least 75% of the depth of the outermost groove.

14. The pneumatic tire according to claim 1, wherein the outermost groove comprises joining portions, comprising an inner joining portion joining the groove bottom with the inner sidewall and an outer joining portion joining the groove bottom with the outer sidewall, said joining portions being one of straight and curved.

15. The pneumatic tire according to claim 14, wherein the joining portions are curved and wherein the outer joining portion comprises a larger radius than the inner joining portion.

16. The pneumatic tire according to claim 1, wherein the groove bottom and the groove opening of the outermost groove are tilted in respect of each other and taper in an axially outer direction.

17. The pneumatic tire according to claim 16, wherein the groove bottom of the outermost groove comprises an essentially straight portion which is tilted with respect to the corresponding groove opening by more than 5°.

18. The pneumatic tire according to claim 1, wherein the innermost groove comprises a further groove opening, a further outer sidewall and a further inner sidewall that is more tilted in respect of a straight line perpendicular to the groove opening of the innermost groove than the outer sidewall of the innermost groove.

19. The pneumatic tire according to claim 18, wherein the inner sidewall of the innermost groove is tilted by between 25° and 40° with respect to a straight line perpendicular to the groove opening of the innermost groove.

20. The pneumatic tire according to claim 19, wherein the outer sidewall of the innermost groove is tilted by between 1° and 10° with respect to a straight line perpendicular to the groove opening of the innermost groove.

21. The pneumatic tire according to claim 1, wherein an outer sidewall of the middle groove is tilted by between 25° and 40° with respect to a straight line perpendicular to a groove opening of the middle groove.

22. The pneumatic tire according to claim 21, wherein an inner sidewall of the middle groove is tilted by between 1° and 10° with respect to a straight line perpendicular to a groove opening of the middle groove.

* * * * *